United States Patent Office 3,740,243
Patented June 19, 1973

3,740,243
HIGH SHEAR, ROLLED ALUMINA CERAMIC
SUBSTRATE
Karl A. Kappes and Sydney Bateson, Oshawa,
Ontario, Canada
Continuation-in-part of application Ser. No. 56,045, June 30, 1970, which is a continuation-in-part of application Ser. No. 852,056, Aug. 21, 1969, which in turn is a continuation-in-part of application Ser. No. 687,872, Dec. 4, 1967, all now abandoned. This application June 21, 1971, Ser. No. 154,983
Claims priority, application Canada, Dec. 20, 1966, 978,467
Int. Cl. C04b 35/02
U.S. Cl. 106—65                    4 Claims

ABSTRACT OF THE DISCLOSURE

A high density high shear alumina ceramic substrate which is especially suitable for use as a substrate for the deposition of thin metallic films used in electronic applications said substrate having a surface smoothness of better than 8 micro inches, without the use of a glaze combined with a bulk tabular crystalline alumina density of at least about 98 percent of the theoretical density of a surface density substantially that of crystalline alumina and a porosity of substantially zero provided by an unique crystalline surface layer of randomly oriented close packed alumina crystals of hexagonal prismatic form on said substrate. The substrates, which are produced from reactive alumina powder, have high flexural strength, excellent electrical properties and are impervious to penetration by metals, dyes or inks.

---

This application is a continuation-in-part of United States application No. 56,045 filed June 30, 1970, now abandoned, which is a continuation of United States application 852,056, filed Aug. 21, 1969, now abandoned which is a continuation-in-part of United States application No. 687,872, filed Dec. 4, 1967, now abandoned. This application is also related to application No. 154,981 filed concurrently herewith. The subject matter of these applications is incorporated herein by reference.

The present invention relates to the production of ceramic substrates useful primarily in the electronics industries. More particularly, the present invention relates to the production of a high density alumina ceramic substrate having superior electrical properties and which in structure has a surface layer formed of a closed compacted mosaic of crystals having a high packing fraction which thus provides a surface of very high density substantially that of the crystalline alumina from which the substrate is formed, low porosity and very high smoothness which makes the substrate highly useful in the electronics industry particularly in thin film microcircuitry. The present invention also relates to the substrates produced by the process of the present invention having the properties and structure set forth above.

In the electronics industry, considerable attention has been focused on thin film microcircuits which due to inter alia the small size of the circuits and the speed of response from such thin film microcircuits are recognized as superior to thick film microcircuits in many fields including inter alia telegraphy computers, small domestic radios, television receivers, transmitters, and satellites. Microcircuits are of two general classes, namely thick film microcircuits and thin film microcircuits. The first variety is fabricated by screen printing and firing conductive resistive and insulating compositions 0.001 inch thick, onto a ceramic substrate, preferably an alumina substrate. Thin film microcircuits are fabricated by depositing thin metallic films primarily by vacuum sputtering techniques. It is desirable that the metal deposited on the substrate should form a film which can serve as a resistive element and that the anodic oxide formed on the film can serve as a dielectric for a capacitative element. To satisfy these requirements microcircuit manufacturers have used tantalum which allows fabrication requirements microcircuit manufacturers have used tantalum which allows fabrication of resistors in the range 50 ohms. to 1 megohm and capacitors of from 0.001 to 0.05 microfarad. The substrate for the thin film microcircuitry therefore has to satisfy several important requirements and in particular it should have high electrical insulating properties a similar coefficient of expansion to that of the thin film and high thermal conductivity for power dissipation. Metallic films for thin film microcircuits are much thinner than those for thick film microcircuits being of the order of 250 to 5000 A. in thickness. While thick film circuits can be deposited upon relatively rough unglazed ceramics having a surface finish from 30–50 microinches, thin films require much smoother substrates, as for example 1–5 microinches surface finish. In particular whereas for thick film microcircuits the demands on the substrate are merely the requirement of a relatively moderate smoothness strength flatness, and low cost, the demands on the substrate used for thin film microcircuitry are substantially greater. Thus because of the extreme thinness of the metal deposit, the flatness and surface finish of the substrate upon which the film is deposited is extremely important. It is also required that the substrate shall have good electrical properties, high density compositional purity, heat stability, high thermal conductivity, strength and resistance to thermal shock.

Heretofore in thin film microcircuitry aluminoborosilicate glasses have been used, and while these glasses satisfy some or most of the requirements set forth above for the substrate they are deficient in certain critical areas because although they have a good surface finish which is suitable for the deposition of capacitors which hold voltages of 100 volts or more, the power rating is low because of the low thermal conductivity, the resistance to breakage of glass is poor, continuous outgassing occurs during pumpdown and the resistance to etchants such as a mixture of hydrofluoric and nitric acid is low resulting in serious undercutting, which can be as high as five times the thickness of the deposited metallic film.

More reecntly therefore, alternative substrates have been investigated and in particular because of its thermal stability resistanec to etchants and good electrical properties much attention has been directed to alumina substrates. However, while alumina is capable of forming a substrate having many of the aforesaid properties required for thin film microcuitry, much difficulty has been encountered in obtaining a smooth surface on the substrate and resort has been made to glazing the alumina substrate so as to have a surface roughness of 1 microinch or better. However, the presence of glaze besides increasing the cost of the substrate decreases the thermal conductivity which limits the resistive power rating of the substrate, decreases the bulk density of the substrate, and does not in any way eliminate the undercutting problem on etching.

Proposals have been made for the production of unglazed alumina substrates for use in thin film microcircuitry and a substrate has been produced of improved surface flatness with a density of 3.9 grams/cc. and a purity of composition which is 99% pure however, the surface finish is about 10 microinches and the substrate has never achieved significant commercial market acceptance for thin film microcircuitry. A process for producing such unglazed substrate is disclosed in U.S. Pat. No. 2,966,719 issued Jan. 3, 1961 in which process a slip of alumina powder mixed with an organic volatile solvent, a wetting agent and an organic binder is formed which is then deposited upon a flexible moving tape support spread and levelled to form a thin layer or film and then dried in situ. The film so produced is then fired to vitrification.

Thus the substrate of greatest utility in thin film microcircuitry must have a high surface smoothness as normally the thin film microcircuitry calls for the deposition of a very thin metallic film, for example a pure or doped tantalum, onto a substrate which has been cleaned by etching, by vacuum sputtering techniques. At a representative film thickness of 250 A., the ideal smoothness is 1 microinch or better. Additionally there must be no penetration of the metal into the substrate and preferably the surface should also be impervious to dyes. Heretofore, in practice, usually the better the surface finish is achieved upon the alumina substrate, the lower is the density of the substrate, and heretofore it has not been possible to produce an alumina substrate having very high surface smoothness, high bulk density and a surface layer density which is substantially that of the crystalline alumina of which the surface layer is constituted.

It has now been found possible to produce an unglazed ceramic substrate preferably having a thickness between 0.004 and 0.40 inch, which are extremely smooth, having a surface smoothness of less than 8 microinches, a high bulk density of at least about 90 to 95% of the density of crystalline alumina, e.g. at least 3.93 and a surface layer of closely packed, randomly oriented alumina crystals of high density substantially that of crystalline alumina forming the surface layer having low porosity, which substrates are gas-tight, have very high flexural strengths, excellent dielectric strength, and can be produced from reactive alumina having a particle size of less than 2 microns.

The present invention thus provides a ceramic alumina substrate for use in thin film microcircuitry both in the resistive and capacitative fields which has superior electrical properties, high purity, high heat stability, high thermal conductivity, high strength and resistance to thermal shock, and at the same time has a high overall density with a surface layer of unique characteristic which provides said surface with very high smoothness, very low porosity, and very high density approaching that of pure crystalline alumina, as well as a method of producing said alumina substrate.

It has now been found that by preparing a visco-elastic mass comprising reactive alumina, a visco-elastic thermoplastic binder, and a solvent in particular proportions, forming said mass into a sheet, rolling said sheet preferably in both directions, under high shear between very hard steel rolls to form a sheet having a yield value, subsequently heating the rolled sheet in stages in which the temperature is raised at a controlled rate to remove any residual solvent and then decompose the binder under oxidizing conditions and firing the sheet at sintering temperature to cause grain growth of 1½ to 5 times the original grain size, the aforesaid unique surface crystal structure on the fired alumina substrate is achieved.

According to the present invention therefore, there is provided a process for the production of a high density smooth ceramic substrate having a surface layer of close packed randomly oriented alumina crystals, providing said surface layer with a high density, which is substantially that of the crystalline alumina in said surface, a low porosity and a low surface roughness of less than 8 microinches, which process comprises mixing reactive alumina powder of less than 2 microns in particle size, with a viscoelastic thermoplastic polymer binder capable, on rolling under high shear, of forming a sheet having a yield value, and with a volatile organic solvent capable of forming a solution with said binder, said binder being present in a volume only sufficient to completely isolate the alumina particles from each other, forming the viscoelastic mass so obtained into a sheet, subjecting the sheet so obtained to rolling under high shear by passing said sheet between highly polished hard rolls to produce a sheet having a yield value, said rolling preferably being effected in both directions across said sheet, said formed sheet containing said solvent in an amount sufficient to avoid significant cracking, but insufficient to cause bubbling in said sheet during said rolling high shear, slowly heating said rolled sheet to the sintering temperature of said alumina powder under controlled increasing temperature such that remaining solvent therein is vapourized off and said binder is burned out from said sheet under oxidizing conditions at a rate such that disruption of the surface of the sheet due to gaseous evolvement is avoided, and firing said sheet at said sintering temperature for a time sufficient to ensure that all the particles become sintered to cause grain growth in an amount between 1½ and 5 times the original grain size of the alumina powder.

The present invention also provides an unglazed alumina ceramic substrate having an unglazed surface layer of randomly oriented, close packed, alumina crystals providing said surface layer with a high density which is substantially that of the crystalline alumina, forming the surface layer, a low porosity and a surface roughness of less than 8 microinches, said body having a bulk density at least about 90% of the theoretical density of the alumina crystals. Further, the body for thin film microcircuitry desirably has a thickness between about 0.004 and 0.40 inch and usually has a bulk density of at least 3.93 and preferably at least 3.96.

A critical step of the present invention is the formation of a surface skin on the unfired green rolled substrate. Upon firing such substrate there is formed a surface layer consisting of a basic (or infra) structure over the surface of which is scattered a rubble. The basic structure consists of randomly oriented large flat crystals of hexagonal prismatic form closely fitted together at the grain boundaries giving an extremely tight structure with a very high packing fraction with practically zero porosity and hence a density within a few percent of the theoretical density for pure crystalline alumina there being substantially no voids between the crystals. The orientation of the flat crystals is random but the growth throughout any one crystal shows hexagonal form. Scattered over the surface of the basic structure is a layer one or at most several grains thick of crystals having a rubber like appearance which are hexagonal alumina crystals with rounded corners. These rubble like crystals also have a mosaic like appearance with no crystals protruding significantly above the other. The surface layer is thus extremely smooth of the order of 5 microinches or less and of extremely high density.

This surface skin is achieved according to the present invention by rolling the sheet of the thermoplastic resin under very high shear, the rolling preferably being in both directions across the sheet in order to obtain the uniform formation of the skin on the surface of the sheet and thus provide for a uniform shrinkage of the sheet during the firing of the sheet. It is believed that such high shear rolling stretches the thermoplastic resin, thus forming the skin and densifies the surface layer during such rolling. In particular due to the characteristics of the thermoplastic resin in having a yield value, it is believed the rolling brings the alumina crystals in the surface layer into sufficiently close proximity such that on firing to effect sintering of the crystals and thus crystal growth, the crystals on growing form the close compacted structure referred to above. Thus the high shear rolling of the sheet is essential to the present invention and further the thermoplastic resin must be one which is capable of forming a sheet, upon such high shear rolling, which sheet upon being subjected to stretching will exhibit a stress-strain curve, having a distinct yield value as set forth for example in ASTM D 638 56 T, p. 38, Part 6, 1957, namely it will exhibit a curve having a visco-elastic portion and a yield value. With such a binder as aforesaid it is believed that upon rolling the sheet under high shear, a surface interface is formed on the sheet in which the alumina crystals are relatively closer together such that on sintering of the crystals, they will form the aforesaid closely compacted surface structure. Between the surface layers it is believed there is a generally amorphous central portion which tends to move with the high shear rolling and in which the alumina crystals are substantially less compacted. Thus, the fired substrate takes the form of a sandwich having very high density closely compacted surface layers with a somewhat lower density interior portion but still high enough for the substrate to preferably have an average bulk density of at least 3.96 gm./cc.

The thermoplastic polymer which is used in the fugitive binder in the process of the present invention includes homopolymers or copolymers such as polyethylenes, polycellulosic polymers, nylons or polystyrenes and is preferably a vinyl resin such as a vinyl chloride/vinylidene chloride, vinyl chloride/acetate or vinyl chloride/butyrate copolymer or an acrylic resin such as butyl methacrylate polymers or a vinyl butyral polymer. A particularly suitable vinyl chloride copolymer is that supplied under the trademark Geon 222 by B. F. Goodrich Chemical Company which is a vinylidene chloride/vinyl chloride copolymer with a specific gravity of 1.52 grams per cc. and an estimated molecular weight of 37,000 to 40,000. The chain length expressed in terms of specific viscosity is 0.17 and in terms of inherent viscosity (ASTM D12-43) is 0.39. A particularly suitable polystyrene is that supplied under the trademark Styron 330 by Dow Chemical Company. A particularly suitable polyurethane is that supplied under the trademark Estane 5701F1 produced by B. F. Goodrich Chemical Company. A particularly suitable butyl methacrylate is produced by Merck and a particularly suitable vinyl butyral is that supplied under the trademark Butvar 76 by Monsanto. Preferably a plasticizer, usually a high boiling ester, is added to the copolymer to reduce the temperature at which the copolymer begins to flow. The particular plasticizer depends on the thermoplastic polymer employed and the capability of the plasticizer to dissolve in the organic solvent. A particularly suitable plasticizer for use with the Geon 222 polymer is triethylene glycol di-2-ethyl hexoate supplied under the trademark "Flexol Plasticizer 3GO" by Union Carbide Corporation.

In the pocess of the present invention the mixture of solvent, reactive alumina and thermoplastic polymer are mixed together and formed into a sheet. This sheet may be formed in any suitable manner, but it is preferably formed by extrusion such as by passing between rollers. In order to prevent the mixture sticking to the rollers and to aid in plasticizing the polymer it is desirable to add a wax to the polymer as a lubricant and many waxes are known in the art. With the Geon 222/3GO composition, it has been found that Carbowax 750, a trademark for a methoxy polyethylene glycol, supplied by Union Carbide is particularly suitable.

The polymer/plasticizer/wax composition is dissolved in a volatile organic solvent capable of forming a solution with the binder composition such as toluene, xylene, methylethyl ketone, or acetone. Preferably toluene is employed as it has the advantage of low cost and suitable volatility. The relative proportion of the polymer plasticizer wax composition and the solvent is a matter of choice and depends upon the availability of the constituents and for example an increase in viscosity of the polymer can be offset by larger additions of the plasticizer and wax or choice of another solvent. However it is essential to the process of the present invention that only a sufficient volume of binder is present to substantially isolate the individual alumina particles from each other. If substantially more binder is present, then the surface structure in the fired ceramic substrate is not obtained. Further, it is important that the amount of solvent present in the sheet passing through the high shear hard polishing rolls is at least sufficient to avoid micro-cracking in the sheet but is insufficient to cause bubbles in in the sheet as the presence of micro-cracks in the sheet will render the ceramic substrate virtually useless in electrical applications, and the presence of bubbles will ruin the surface smoothness. The amount of solvent therefore present in the original mix will be sufficient for the mix to form a sheet. Thus in accordance with one embodiment of the present invention the amount of solvent in the mix is optimum for forming the sheet and subsequent to the formation of the sheet, the amount of solvent in the sheet is adjusted, preferably by subjecting the sheet to an atmosphere of the solvent, to the optimum for the high shear rolling of the sheet. It is within the scope of the present invention to feed the mix directly to the high shear hard steel rolls and use the high shear hard steel rolls as the extrusion means for forming the sheet as well as for subsequently forming the surface skin on the sheet. However, the use of the high shear rolls as also the extrusion rolls suffers from many practical disadvantages amongst which is the fact that the extrusion of the mix into the sheet tends to leave pieces of the mix on the rollers which pieces can be tolerated in extrusion rolls; but in the high shear rolls the presence of those pieces cannot be tolerated as they will ruin the surface of the sheet during the subsequent high shearing rolling of the sheet. Therefore, from a practical point of view the mixture which is usually in the form of a lumpy coherent mass is fed to a pair of forming rolls which form the sheet, the amount of solvent in the mix being desirably optimum for forming the sheet. The formed sheet is then subjected to high shear rolling after the solvent content of the sheet is adjusted to optimum for the high shear rolling.

The choice of thermoplastic polymer/plasticizer/wax/solvent system is such that the resultant fugitive binder composition is a visco-elastic material and is also capable of forming a sheet on rolling under high shear which exhibits a yield value as referred to heretofore. Thus, it follows that if the binder is visco-elastic and exhibits a stress-strain curve which is characteristic of such material on high shear rolling, the binder plus the active alumina will in the unfired state also be visco-elastic and exhibit such a curve, because the active alumina does not in itself have any inherent plasticity. The term "visco-elastic material" may be defined as any material which has the characteristics of viscous liquid and at the same time exhibits elastic characteristics.

The refractory material forming the substrate according to the present invention is reactive alumina. Reactive alumina useful in the process of the present invention is to be distinguished from the material known as active alumina. While both reactive alumina and active alumina are basically aluminum oxide their function and chemical quality differ completely. Activated alumina is a product obtained by under-calcining $Al_2O_3$ in the manufacturing process and as such its structure and reaction kinetics make it an excellent absorber of e.g. water vapour and as such is chemically active as compared to alumina which is relatively inactive at room temperature and as such the material is merely used as a reagent and not a ceramic material. Reactive alumina useful in the process of the present invention however sinters at a lower temperature and in a much shorter time than nonreactive alumina. The reason for this is not considered to be in the chemical composition but rather in the small size of the crystals the difference in particle size distribution and to some degree the surface morphology of the particles. Reactive alumina is characterised by high green density which fires a dense low shrinkage ceramic under lower time/temperature conditions. Substrates formed from other refractory material following the steps of the process of the present invention are found to be expensive to produce and lack one or more of the aforesaid desirable properties which are required for a substrate for use in thin film microcircuitry. Non-reactive alumina is found to sinter at very high temperatures of about 1700° F. or higher which temperatures drastically shorten kiln life and render substrates formed from non-reactive alumina expensive to produce. The reactive alumina in order to obtain the high density, smooth surface structure of the substrate, should have a particle size of less than 2 microns and preferably the particle size should be in the range 0.3 micron to 0.5 micron. In order to obtain the required physical and chemical properties in the substrate the reactive alumina should have the highest purities possible capable of sintering. However, additives such as MgO may be present to promote sintering and retard grain growth suitably in an amount up to 0.05 weight percent. The presence of a small amount of gamma alumina can be tolerated as it is converted in the process to the alpha form. A typical reactive alumina which satisfied these requirements is about 90% alpha-phase and 10% gamma or intermediate phase and has a particle size of about 0.3 micron. Reactive aluminas are available from various commercial sources and it has been found that a 0.3μ alumina polishing powder distributed by Adolph Meller Company of Rhode Island is particularly suitable in the process of the present invention. This material has the following characteristics:

Chemical formula: $Al_2O_3$, alpha-phase
Crystal shape: Hexagonal
Hardness (mohs): 9
Partical size: 0.3μ
Density: 0.25 g./cc.
Melting point: 2050° C.
Purity: 99.98%

Other suitable reactive aluminas are those sold by Aluminum Company of America Inc. under the trade marks XA 15 (which is a particle 1–2μ long and about ¾μ thick and contains magnesium oxide in an amount 0.05 to 0.1% as a sintering aid to promote grain growth on firing) and XA 16 (which is a particle of less than 1μ) and Linde A 0.3μ alumina polishing powder supplied by Union Carbide Corporation.

In carrying out the process according to one embodiment of the present invention, the polymer, plasticizer and wax are dissolved in about 50 percent by volume excess solvent, preferably toluene with constant stirring and gentle heating. The reactive alumina is then added to the solvent, or vice versa, in proportions so that there is suitably about 9 to 40% by weight of the powder, of the binder present. Alternatively, the dry resin copolymer, plasticizer, wax and reactive alumina may be mixed and then the solvent may be added. The precise amount of the binder depends upon the exact size of the particles of the reactive alumina powder but in all cases the binder must only be present in only sufficient volume to substantially separate the individual powder particles. Excess binder must be avoided as it allows plastic working of the binder without movement of the reactive alumina particles towards each other. Insufficient binder causes shortness and complete disruption of the material. The amount by weight of the binder will depend upon its density and suitably for Geon 222 having a relatively high density of 1.52 it is found to be in the range 9 to 40% based on the weight of the alumina powder. For lower density binders such as polyvinyl butyral resins and acrylic resins the amount of binder required may be less and may be as low as 5 or 6% by weight based on the weight of the alumina powder. It will be realized that the binder merely serves as a means of forming the rolled sheet and is subsequently removed from the sheet by burning before firing of the sheet. Thus the minimum amount of binder is desirably used commensuurate with satisfying the requirements set forth herein. The volume of binder required is determined inter alia by the surface area of the alumina particles and the particular binder being used and thus can readily be determined by simple experimentation. The mixing is usually accomplished by simultaneous metering into a Muller type mixer. Thus, in the mixture at least some of the individual particles are completely coated with the binder so that ideally a thin layer of binder separates the adjacent particles. The product obtained is a relatively dry, lumpy and coherent mass which is visco-elastic which is then extruded, preferably by passing through extrusion rolls into a sheet. The rolling is normally carried out between rollers which are heated to within the plastic working range of the particular binder system forming the visco-elastic mass, which is usually between 40 and 70° C. for ease of working. A roll speed of about 5 r.p.m. has been found to be satisfactory for use with rolls of 13" diameter. High rolling pressures are employed and 5–10 passes of the material through the rolls is effected. A single pass causes a reduction of the order of 10–50% and rolling is continued until a desired thickness is obtained. After trimming the edges of the sheet, the sheet is preferably enclosed in an atmosphere of the solvent so as to adjust the solvent content thereof to optimum for avoidance of cracking and bubbling and passed between cold highly polished or chromed steel finishing, rolls, the passage continuing until the desired surface finish is obtained on the surface of the rolls. In order to obtain a uniform surface finish on the sheet and uniform shrinkage during firing of the sheet, it is desirable to pass the sheet through the rolls in both directions i.e. longitudinally and transversely of the sheet. The product of the high shear roll is a pliable strip of material which has a high gloss finish. The term "high gloss" means a finish which results in high spectral gloss which is defined as spectral reflectance at oblique incidence usually 45°. The higher the spectral gloss the less the angle of incidence becomes, at which spectral reflectance is sharply defined. Differences of one or two microinches can be detected by visual observation and it may be therefore said that the high shear rolling operation results in an unfired surface of about 1–2 microinches. The substrate at this point has its final thickness which is desirably from 0.004 inches to about 0.40 inches and preferably is in the range 0.004 to 0.03 inches. Following the high shear rolling, the sheets or strips are cut into convenient sizes as required for the final substrate.

The cut pieces are then subjected to a drying burn out and firing procedure which determines the final surface finish of the substrates. If the substrates are fired at too high temperature or for an excessively long period, excessive grain growth occurs and the smooth surface is impaired. For electronic purposes where transparency is not required and high density and flexural strength is required, grain growth should be restricted so that the final sintered grain size is from 1½ to 5 and preferably between 1½ and 3 times the original grain size. It has been found that the alumina substrates must not be heated above about 1625° C. and the soaking time at the temperature should not exceed 4 hours in order to ensure the average grain size of the sintered particle does not exceed 5 times the original grain size. The actual firing time and temperature depends largely upon the particular active alumina selected. When firing XA 16 alumina polishing powder soaking at 1550° C. for one hour is sufficient. The firing is normally carried out in stages in air, but air atmosphere is satisfactory with the proviso that up to about 850° C. there is sufficient oxygen present to burn out the carbonaceous materials. The actual rate of heating depends upon the binder content and the thickness of the particular sheets. As there is a relatively large amount of volatile material present, the heating rate must be adjusted so that evolution of gas is at a relatively steady rate. Excessive evolution could disrupt the surface of the material. The firing may be conducted by loading the sheets onto setter tiles and passing them into a batch or continuous type kiln such as is conventionally used in producing ceramics. Alternatively, at least the initial stages may be conducted in an air cushion kiln in which the sheets are floated through a tunnel type kiln on a cushion of heated air. The air may be heated progressively along the length of the kiln so that a temperature gradient from about room temperature to 250° C. is established in the air drying kiln. A sheet of, say, 0.010 thick would pass through a temperature gradient in about 3½ to 4 hours particular care being taken in the temperature range 110–150° C. during which large quantities of volatiles are evolved. In this range, the rate of heating is preferably halved. The secondary firing kiln usually raises the temperature from 250° C. to the soaking or sintering temperature selected in about 24 hours. Following the soaking period, which as noted should not exceed about 4 hours at 1625° C. if excessive grain growth is to be avoided, the fired sheets are slow cooled, preferably in the kiln. Cooling may be for as long as 10 hours, i.e. overnight, but is not critical. The product of the present invention is a substrate having a surface smoothness better than about 8 microinches C.L.A. (center line average) combined with a bulk density of at least about 90 to 95% theoretical density of the alumina, and a surface layer of closely compacted crystals having a density substantially that of the theoretical density of the alumina. The product has high flexural strength, high dielectric strength and is completely gas-tight. Metals deposited on the surface do not penetrate the surface and the high density of the surface is sufficient to prevent even ink penetration. As aforesaid, it is believed that the smoothness and high density of the surface can be attributed importantly to the high shear rolling process to which the material is subjected. The rolling forces the particles in their plastic coats towards one another at the surface skin of the sheet such that on sintering they form the close compacted structure.

The present invention will be further illustrated by way of the following examples and the accompanying drawings. In the examples the Talysurf reading is the reading from an instrument used to measure surface irregularity. A Talysurf machine measures the center line average (C. L. A.) of the surface variation from perfect smoothness and is a standard technique in the art. The term Talysurf is a registered trademark of Taylor, Hobson for the instrument.

In the accompanying drawings

FIG. 3a is a Talysurf record of the smoothness of the surface of the substrate of FIG. 2a.

FIG. 3b is a Talysurf record of the smoothness of the surface of the substrate of FIG. 3a.

FIGS. 4a–e are scanning electron microscope photographs at magnifications of 100×, 500×, 1000×, 3000× and 10,000× respectively of the surface of a ceramic substrate produced by the process of Example 6.

Figure 5:
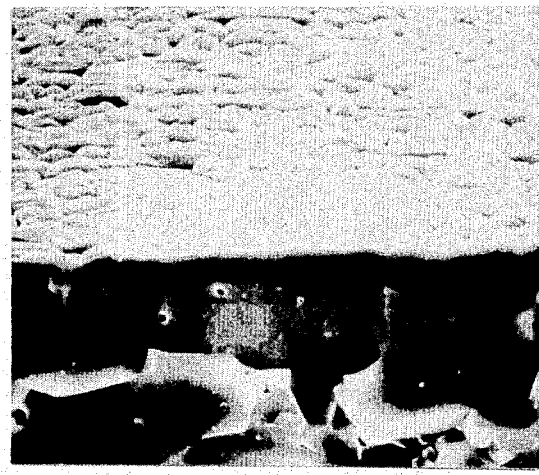

FIG. 5 is a scanning electron microscope photograph at a magnification of 1800× of a fractured substrate prepared according to the process of the present invention.

Figure 6A:
Figure 6B:
Figure 6C:

FIGS. 6a, 6b and 6c are scanning electron photographs at magnifications of 5000×, 7500× and 10,000× of refired ceramic substrates produced by the process of Example 6.

Figure 7A:
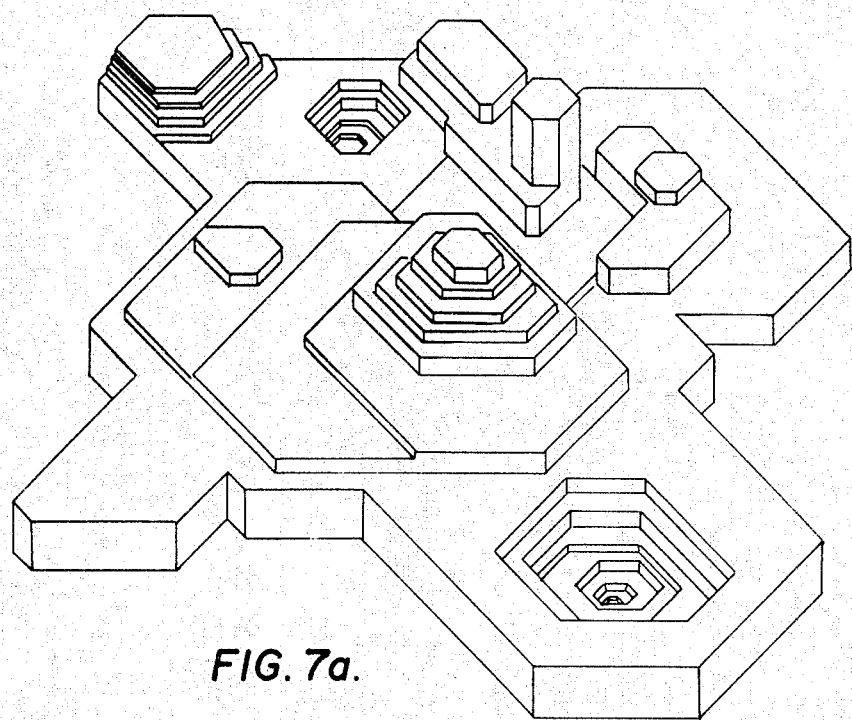
Figure 7B:
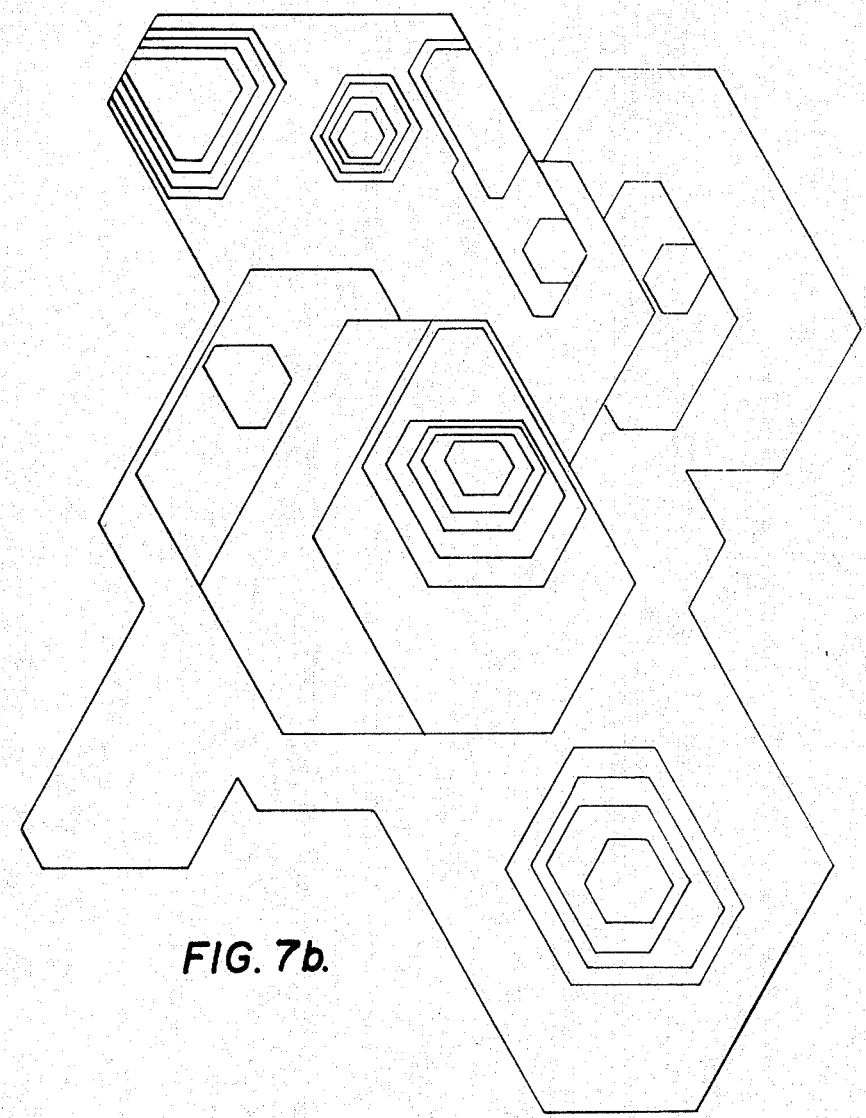

FIGS. 7a and 7b are a schematic, perspective and plain representation of a single alumina crystal in the uniform structure of a ceramic substrate produced by the process of Example 6 showing parallel growths.

Figure 8A:
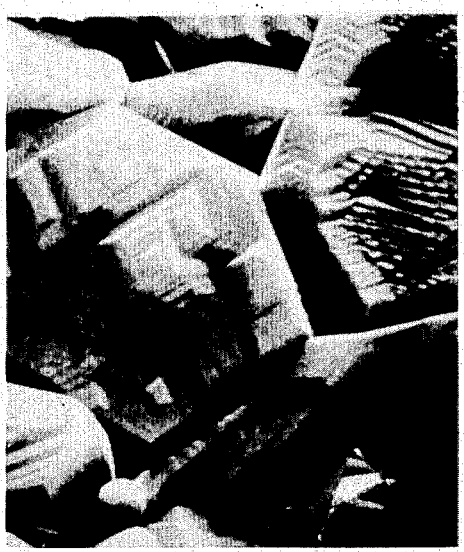

FIG. 8a is a scanning electron microscope photograph at 10,000× of the surface of a ceramic substrate produced by the process of Example 6 showing the direction of the c-axis at the crystal growth boundaries.

Figure 8B:
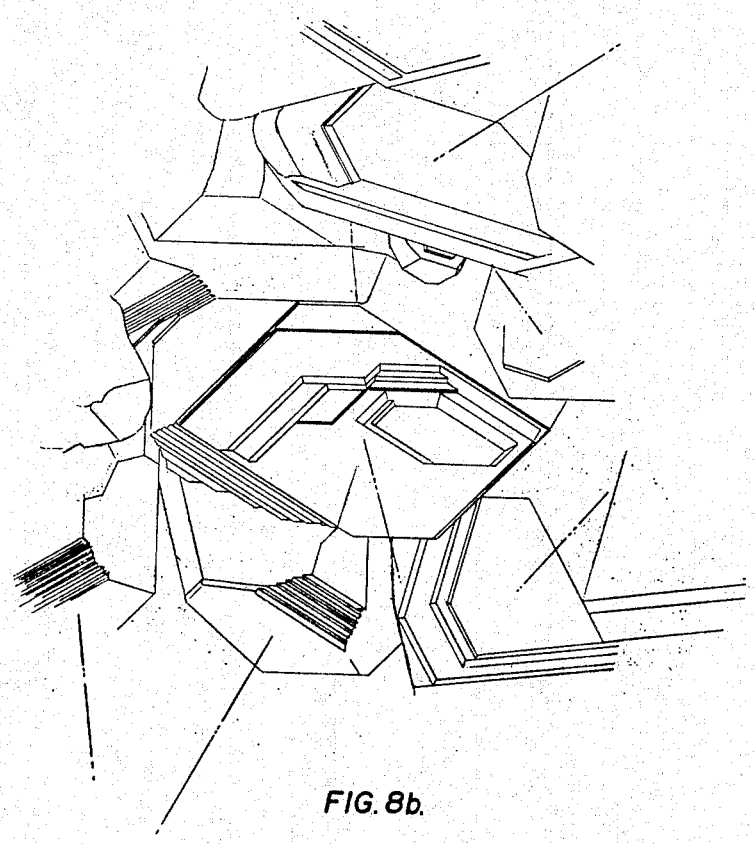

FIG. 8b is a schematic diagram of the crystal structure shown in FIG. 8a.

Figure 9:
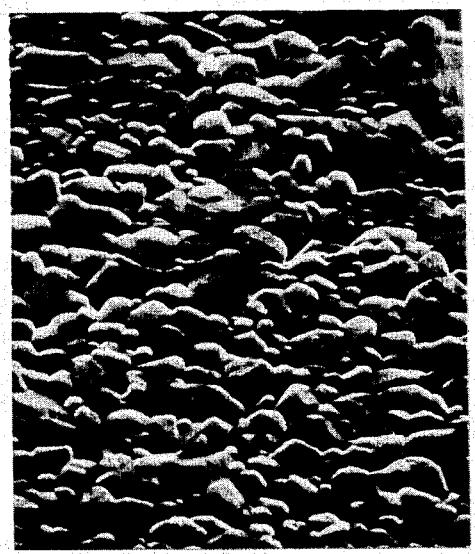
Figure 10:
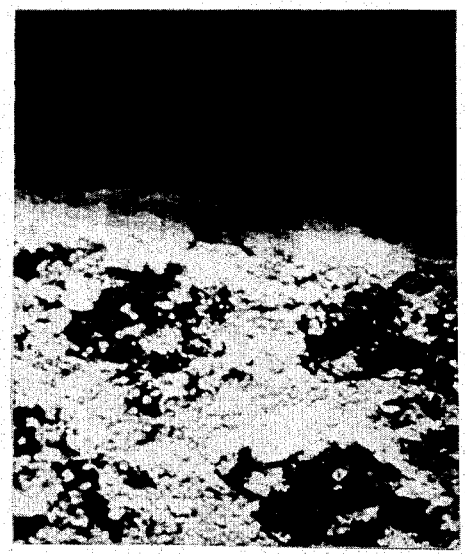

FIG. 9 is a scanning electron microscope photograph at 4,500× of a ceramic substrate according to the present invention showing low contrast in the surface grains, and FIG. 10 is a scanning electron microscope photograph at magnification of 3000× of a substrate with the organics removed.

EXAMPLE 1

A binder comprising:

24.0 gms. Geon 222 vinyl chloride copolymer
3.0 g. 3 GO Plasticer
1.2 g. Carbowax 750 wax was dissolved in a 50 percent by volume excess of toluene.

This binder was mixed, with 100 g. of $0.3\mu$ "Meller" alumina polishing powder, as hereinbefore described.

The mixing was continued until no uncoated alumina particles were visible, and then warm air was blown over the surface of the mixture, with continued mixing until the mixture assumed a relatively dry but coherent and lumpy consistency.

The mixture was then passed five to ten times through a pair of rolls (Mill No. 1) heated to between 50 and 70° C. and rotating at about 5 r.p.m. Heavy pressure in the order of 20,000 p.s.i. was applied, the rolls being 4" in diameter and designed to withstand a force of 40,000 pounds without distorting, and the lumpy mass was reduced to a sheet 0.010 inch thick, in the form of a leathery, pliable strip. Following rolling to size, the strip was edge trimmed and rolled equally in both directions between unheated chromed polishing rolls under high shear (Mill No. 2) until no further improvement in surface finish could be obtained, as measured by visual inspection of the spectral gloss. The green substrate thus produced was then cut into 4" x 2" pieces. A hardness survey across the substrate with a Shore A2 Durometer indicated a Shore Hardness between 95 and 100. This is indicative of the close packing of the alumina crystals in the surface skin of the substrate.

Figure 1A:
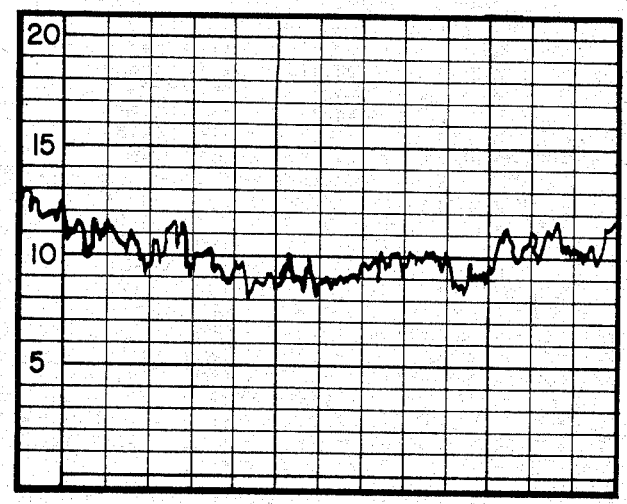
FIG. 1a is a Talysurf record of the smoothness of the surface of a substrate prepared according to the process of the present invention.
Figure 1B:
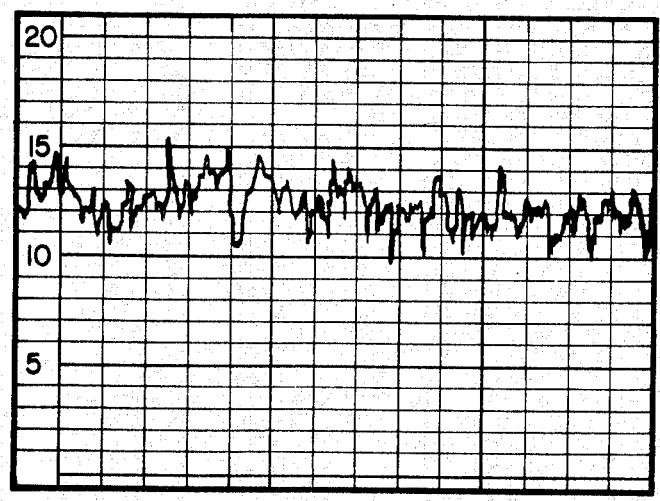
FIG. 1b is a Talysurf record of the smoothness of the surface of a conventional ceramic substrate.

Following cutting, the pieces were loaded onto setter tiles with an air space between each setter tile and heated in a conventional, electrically heated air circulating kiln to 1550° C. The temperature was raised from room temperature to 250° in 3½ hours and from 250° C. to 1550° C. in a further 24 hours. The temperature of the kiln was maintained at 1550° C. for 1 hour and then the power was turned off. The substrates were allowed to cool in the kiln for 10 hours. The substrates were then examined under the Talysurf machine and found to have a smoothness of about 3 micro inches. The Talysurf record is shown as FIG. 1a (A commercially available substrate was tested on the Talysurf machine for comparison, and the result appears as FIG. 1b). The substrates were then tested and found to have the following essential characteristics:

| | |
|---|---|
| Composition | 99.9% $Al_2O_3$ |
| Flexural strength | 70–80,000 p.s.i. |
| Bulk specific gravity | 3.95–3.96. |
| Porosity | gas tight. |
| Hardness (Mohs scale) | 9. |
| Dielectric strength at 100° C. | 1400 D.C. volts/mil. |
| Dielectric strength at 25° C. | 675 A.C. volts/mil. |
| Dielectric constant 1 KC at 25° C. | 10.5. |
| Dissipation factor | 0.0003. |
| Undercutting by HF/$HNO_3$ | Nil. |
| Thermal conductivity (25–300° C.) | .036 cal. cm./sec. cm.² ° C. |

EXAMPLE 2

A binder comprising:

22.2 g. Geon 222 vinyl chloride copolymer
4.5 g. 3 GO Plasticizer, and
1.5 g. Carbowax 750 wax dissolved in 50 percent by volume of toluene and blended with 100 g. 0.3µ "Meller" alumina and processed according to the process of Example 1. Substrates having a surface smoothness of 3 to 5 micro inches and having similar properties to the product of Example 1 were produced. The higher plasticizer content and slightly lower resin copolymer content resulted in a more easily workable mix and a more flexible green sheet without noticeable effect on the green Shore Hardness.

EXAMPLE 3

Further substrates using the process and compositions of Examples 1 and 2 were produced except for minor modifications in the amount of plasticizer, copolymer and wax. No effect on the properties of the final substrate were noted when the platsicizer was varied between 3.9 and 4.5 g. and the copolymer between about 22 and 24 g. It was noted that at higher levels of plasticizer and/or wax, the green sheet was more flexible and slightly softer. Reduction in copolymer resulted in a stiffening of the green sheet and at below 22 g. the green sheet was brittle. At low copolymer content, rolling became extremely difficult and rolling times had to be increased in order to obtain a smooth sheet.

EXAMPLE 4

100 g. of XA-15 Alumina (a reactive grade alumina produced by Aluminum Co. of American and comprising platelike particles 1 to 2µ long and about ¾µ thick.) was blended with a binder comprising:

11.29 g. Geon 222 vinyl chloride copolymer
1.86 g. 3 GO Plasticizer
and 0.71 g. Carbowax 750 dissolved in a 50 percent volume excess of toluene and treated according to the process of Example 1. The final substrates had a surface smoothness of 8 micro inches and other properties corresponding to the properties of the product of Example 1, except that the density was 3.92. It will be noted that the larger particle size resulted in a marked decrease in the amount of binder required.

EXAMPLE 5

100 g. of XA-16 Alumina (a reactive grade alumina produced by Aluminum Co. of America and having a particle size of less than 1µ).

was blended with a binder comprising:

19.75 g. Geon 222 vinyl copolymer
3.25 g. 3 GO Plasticizer
and 1.25 g. Carbowax 750 dissolved in a 50 percent volume excess of toluene. The mixture was processed according to the process of Example 1. The substrates produced had a surface smoothness of 5 micro inches.

EXAMPLE 6

4600 g. of XA-16 Alumina (as hereinbefore described) and 790 g. of Geon 222 vinyl chloride copolymer were dry blended in a Day mixer for 10 minutes.

130 g. 3 GO Plasticizer and 50 g. of Carbowax 750 were dissolved in 100 ml. of toluene and added to the dry mix in the mixer over a period of 2 to 3 minutes while the mixer was in operation to ensure as even distribution as possible. An additional 400 ml. of toluene were slowly added over a period of 6 minutes while continuing mixing. After a further 4 minutes mixing, the mixture was discharged into a toluene vapour tight container and stored until required in the rolling stage. The rolls of the 13" rolling mill (Mill No. 1) were heated to 45° C. and the mixture was worked in 750 to 1000 g. batches. The rolls were spaced sufficiently close to cause the mixture to pile up before it was tipped (i.e. the mill was flood fed). The rolling operation (at 5 r.p.m.) was conducted for 10 minutes, turning the edges of the sheet to the centre after each 100 percent increase in extension. Rolling to ensure a total 1000 percent elongation in length and width was conducted. After rolling the sheets, now about .025 inch thick, were dried at 80–90° C. to remove a substantial portion of the toluene. The dried sheets were then rolled under high shear equally in both directions on hard chrome cold polishing rolls of a second rolling mill (Mill No. 2) as in Example 1. The "green" sheets were trimmed to final size and were heated at 20° C./hr. up to 250° C. to at least partially break down the resin binder. The prefired pieces were then loaded on grooved high purity alumina setter tiles, into a Bickley Model 2320-6 laboratory kiln and fired in 7 hours to 1550° C., and then soaked at this temperature for 1 hour. The power was then shut off and the sheets were cooled in the furnace to 300° C. before they were removed. This procedure resulted in alumina ceramic sheets having a smoothness of 3 to 5 micro inches and other properties as follows:

| | |
|---|---|
| Composition percent $Al_2O_3$ | 99.7 |
| Flexural strength p.s.i. | 35,000 |
| Bulk specific gravity | 3.93 | and other properties as set forth for the product of Example 1.

EXAMPLE 7

A mixture was prepared, rolled and polished as in Example 6. The sheets were cut into 4" x 2" tiles and a central score line was made. The tiles were then floated on an air cushion through a continuous air drying kiln about 20 feet long which raised the temperature to about 250° C. in 3½ hours. The wax and plasticizer was driven off and the resin was partially broken down. At the end of the air cushion kiln, the sheets appeared as dark brown brittle sheets having a very glossy surface. The sheets were snapped along the score line into 2" x 2" pieces and loaded onto high grade alumina setter tiles. The setter tiles were stacked and raised into a gas fired furnace.

The temperature was raised to 1550° C. in 24 hours and held at that temperature for 4 hours. The tiles were then allowed to cool in the furnace to 300° C. in about 10 hours. The substrates thus produced had identical properties to the product of Example 6.

Figure 1C:
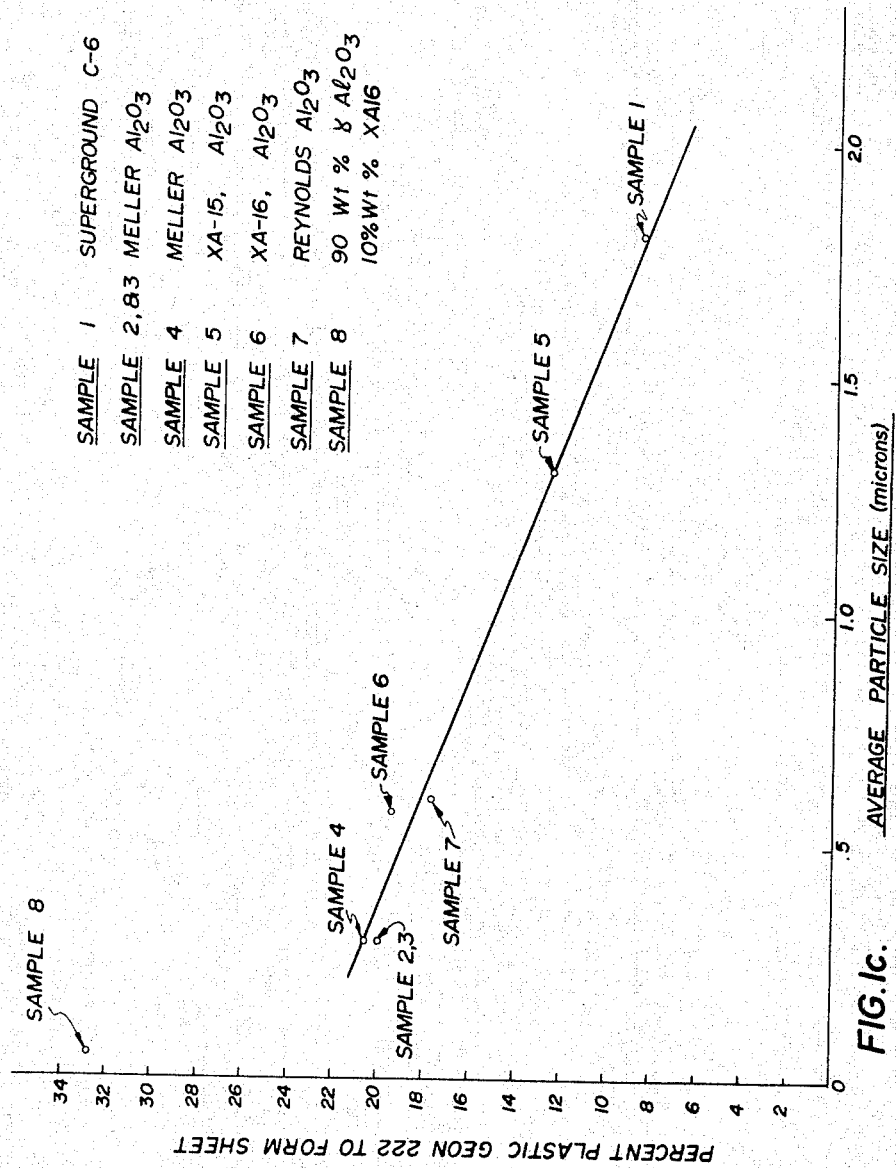
FIG. 1c is a graph showing the percentage Geon 222 binder required for successful sheeting for reactive alumina compositions of varying particle size.

A number of different samples of reactive alumina, i.e. Samples 1 to 7 in FIG. 1c having similar composition i.e. containing about 90 weight percent $\alpha Al_2O_3$ and .10 weight percent $\gamma Al_2O_3$ were mixed according to the procedure of Example 6 with varying amounts of Geon 222 binder and the mixture rolled according to the procedure of Example 6. The composition of the mixture and the average particle size of the reactive alumina in the mixture was noted for those mixtures which were successfully sheeted in accordance with the present invention. The results are given in FIG. 1c which thus represents the percentage Geon 222 necessary for successful sheeting for reactive alumina powders of various particles sizes of the composition in the examples. Sample 8 is a reactive alumina powder of totally different composition containing 90 weight percent $\gamma Al_2O_3$ and 10 wt. percent XA-16. It will be seen that the percentage Geon 222 lies well off the curve and it is believed that this is due to the different composition of the reactive alumina powder and constitutes a point on a similar plot for reactive alumina of this composition.

Minor modifications were possible in all the above examples with respect to resin/wax/plasticizer ratios, the binder/alumina ratio and the time and temperature of sintering. In all cases, it has been found that an increase in sintering time causes a deterioration in surface finish, and a decrease in sintering temperature lowers the final density. Thus, for optimum physical and mechanical properties, these factors must be carefully related.

Figure 2A:
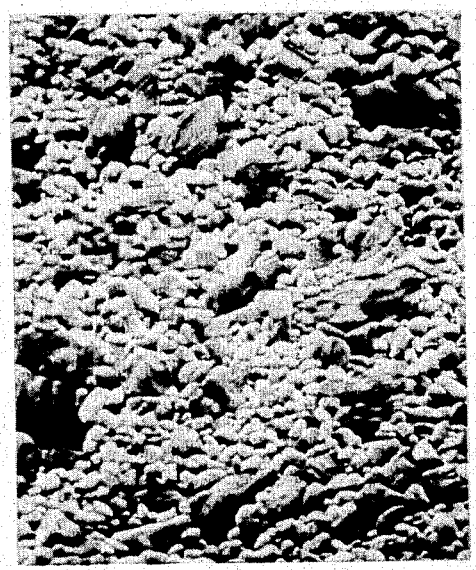
FIG. 2a is a scanning electron microscope photograph at a magnification of 2000× of a substrate prepared according to the process of the present invention.
Figure 2B:
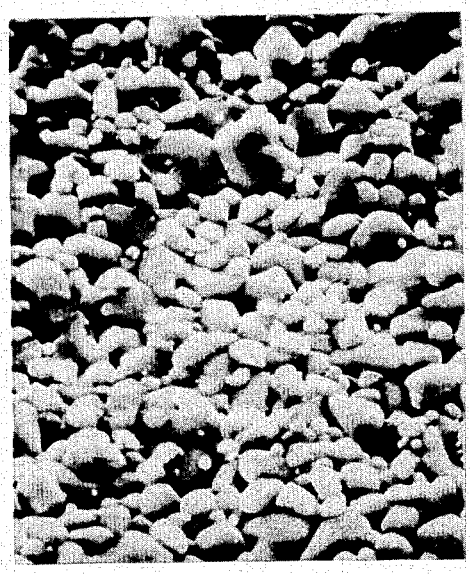
FIG. 2b is a scanning electron microscope photograph at a magnification of 2000× of a conventional ceramic substrate.
Figure 3A:
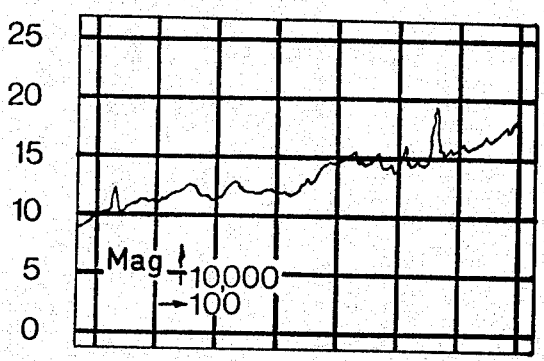
Figure 3B:
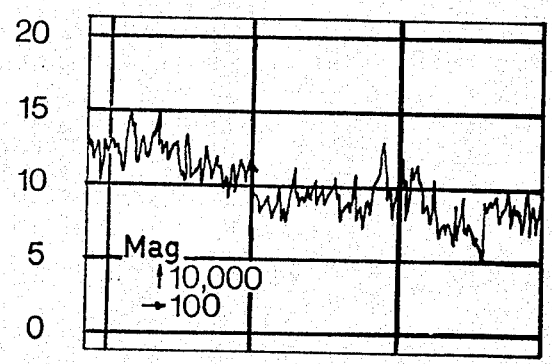

FIGS. 2a and 2b are scanning electron microscope photographs at the same magnification of 2000× of the surface respectively of the substrate produced by the process according to Example 6 and a substrate produced by a conventional process by American Lava, the substrate being a commercial substrate sold by American Lava. Both substrates were made from a similar basic aluminum material of the same particle size and particle size distribution and both substrates have the same chemical properties. However, there is a marked difference between the surface morphology of the two substrates. The surface morphology of the substrate of FIG. 2b consists of a predominantly rubble-like granularity similar to that produced by sintering crystalline alumina. In contrast thereto in the substrate of FIG. 2a, the surface morphology consists of a basic hexagonal prismatic crystal structure partially covered by a rubble-like crystal structure. Thus with the substrate of FIG. 2b the surface finish depends entirely upon the particle size of the crystals in the absence of the hexagonal prismatic crystal surface morphology and it is found that the substrate of FIG. 2a has a better surface finish as shown from the Talysurfs of FIGS. 3a and 3b respectively, the surface finish of the substrate of FIG. 2a being a little less than 4 micro inches C.L.A. and that of the substrate of FIG. 2b being in excess of 10 micro-inches C.C.A. Further, the substrate of FIG. 2a has a substantially higher density.

Figure 4A:
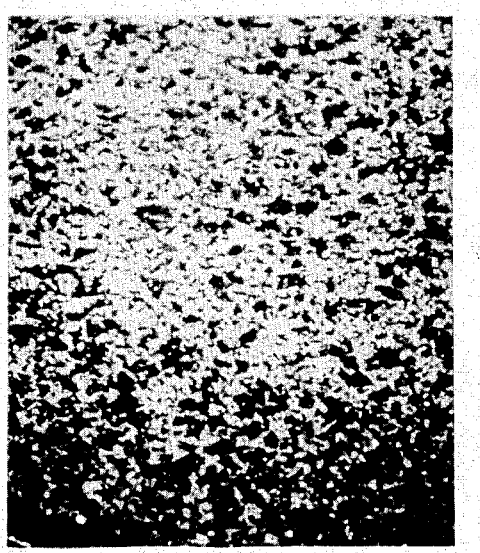
Figure 4B:
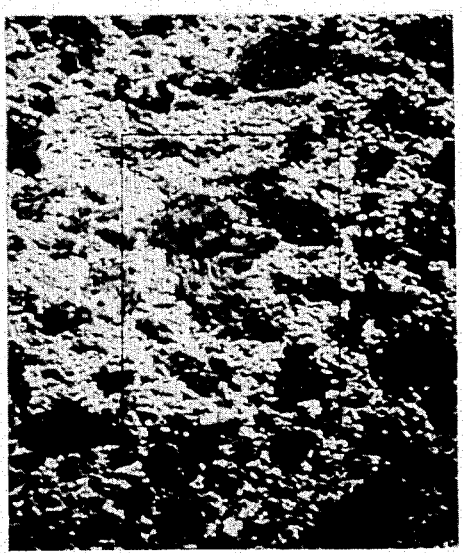
Figure 4C:
Figure 4D:
Figure 4E:

The surface morphology of a substrate of the present invention as produced by the process of Example 6 is shown in FIGS. 4a, b, c, d and e which are scanning electron microscope photographs of the same area of the substrate at various magnifications which shows the hexagonal prismatic crystalline structure and high packing fraction of the alumina crystals as well as alumina hexagonal crystals forming the rubble on the surface of the basic hexagonal prismatic structure.

To more clearly see the crystal structure of the surface of the substrate a sample of the ceramic substrate produced by the process of Example 6 was fractured and a scanning electron microscope photograph was taken of the edge as shown in FIG. 5. It will be seen from FIG. 5 that while large masses of crystalline sintered alumina can be seen the precise crystal structure of the fractured surface is not clearly discernable. In order to more clearly see the type of crystal structure, several samples of the ceramic substrate produced by the process of Example 6 were fired for longer times at 1550° C. in order to increase the grain size, i.e. they were overfired. Scanning electron micro-photographs were taken of the substrates at various magnifications as shown in FIGS. 6a, 6b and 6c and it will be seen from these figures that due to the over-firing the crystalline alumina rubble gradually merges into the crystalline infra-structure by solid diffusion and as the sintering is carried still further, large areas of the alumina grains are revealed and these areas are clearly made up of hexagonal crystalline alumina, closely fitted together at the grain boundaries to provide an extremely tight structure with practically zero porosity and hence a density within less than one percent of theoretical. Thus it is seen that the alumina crystals are hexagonal prismatic and building of the crystals is by a process of parallel growth as shown schematically in FIGS. 7a and 7b. It will be further seen that the crystals have their c axes variously oriented to the surface thus the plates of the crystals are stepped at random to the surface as shown in the photographs. It was also found as will be seen from FIGS. 8a and 8b that the direction of the c axis at the grain boundaries separating the crystals are different and appear to be completely random.

The structure of the rubble-like alumina crystals on the surface of the unfired structure of the substrate produced in Example 6 is as indicated in FIG. 9 which is a scanning electron photograph of a substrate produced by the process of Example 6. It will be noted that the image appears to be low in contrast and reason for this is believed to be the mosaic-like appearance and lack of crystals in the rubble significantly protruding above the average, i.e. the crystals of the rubble form a close packed structure.

Thus, in the final form the fired substrate possesses a number of unique characteristics one of the most important of which is the unusually high density in the surface crystal uniform structure approaching theoretical for crystalline alumina. Clearly, a high packing fraction has been achieved and thus low porosity. The surface of the ceramic substrate is made up of a layer of crystals much like rubble in appearance which are hexagonal alumina crystals with rounded corners with a very high degree of fitting like a mosaic. The depth of the layer which is scattered over the as-fired structure is on average 1 or at most several grains. The basic (infra) structure over the surface of which the rubble is scattered consists of large alumina crystals of hexagonal prismatic form closely fitted together at the grain boundaries to provide an extremely tight structure with practically zero porosity and hence a density within a few percent of theoretical. The orientation of the crystals is random but the growth throughout any one crystal shows the hexagonal form. Particularly striking are stereopair photographs taken by a scanning electron microscope which shows that these grains do not join together at the grain boundaries as crystals simply grow until the material has been used up and do not merge into one another but remain completely isolated but very closely fitted which is an epitaxial phenomenon. Series of stereo photographs were taken on a scanning electron microscope with a goniometer stage with a magnification of 2000× with a left viewing angle of 51° and a right viewing angle of 45° amounting to a 6° stereotilt. These photographs were taken on the substrate produced according to Example 6 as well as the substrate of American Lava referred to in FIG. 2b. The individual particles in both cases appeared like rubble but the latter particles were two or three times as large on the average as the former and in both cases the infra-structure of large grains which are boundary sintered can be seen here and there protruding from the rubble. In the case of the substrate of Example 6 the crystal habit is clearly tabular while in the case of the substrate of American Lava the crystal habit is not clearly defined. The striking difference between the two surfaces shown in the stereo photograph is that the individual pieces which form the rubble are fitted together like a mosaic in the substrate of the Example 6 whereas in that of the American Lava substrate they are not fitted together but appear to be resting on the surface of the infra-structure at random.

In the process set forth in Example 6 the material obtained from the mixer is a visco-elastic material having the alumina particles randomly but uniformly distributed therethrough. After rolling on Mill No. 1 a portion of the sheet on subjection to testing on an Instron Tester gave a stress/strain curve the shape of which indicates the material properties which are those of a viscous mass having no yield value in the sense of Bingham's definition and little or no elasticity and hence has no true plastic qualities. On firing such a substrate for 4½ hours at 1550° C. scanning electron microscope photographs showed no evidence of surface differentiation and little evidence of hexagonal prismatic crystal growth and the surface of the substrate was quite rough.

After passage of the substrate from Mill No. 1 through Mill No. 2 which passage reduces the substrate to the desired thickness and applies a shiny appearance to the green substrate, similar testing on the Instron Tester gave a stress/strain curve the inital slope of which shows the presence of much more elasticity in the material than that from Mill No. 1 and the working range of the plastics as being tremendously enhanced. The substrate thus presents two very smooth outer surfaces which are plastic in nature, that is they have considerable elasticity at the Bingham yield value. The inside of the sheet about 25 mils thick is almost entirely viscoelastic with a low yield value, no significant elasticity but which is capable of flowing visco-elastically under shearing forces. The net physical properties of this compound or binary material are quite similar to those of mild steel. The material forming the substrate is incompressible and hence the distance between the particles cannot be altered by hydrostatic compression during the high shear rolling process. During this high shear rolling process however, the surface is subjected to shearing force between roll and plastic sufficient to distort it. The inner material must flow under the stretching action of the rolls and because there is no change in volume the increase in area of the sheet must be compensated for a decrease in thickness. Thus, the rolling process is not one of hydrostatic compression but of shear, that is the surface is stretched and the center relaxes visco elastically and ends up under practically zero stress. This behaviour is shown by the stress/strain curve.

It is most significant that the magnitude of the yield value is quite independent of the sheet thickness however, this yield value is quite sharply measurable and unlike the overall breaking stress of the sheet which is quite erratic. Thus, after the sheet emerges from Mill No. 2 the surface has been elastically extended but is relaxed to a state of permanent extension in the direction of rolling, the core is practically stress free and core has relaxed to its original state except for some solvent loss. It is therefore believed that the inside of the sheet of the particles of alumina are situated at about the same distance from each other as in the original mat but those particles in the surface layer have moved further apart in the surface plane along the rolling direction and have moved closer together in a direction perpendicular to the surface. This follows because the plastic mass is incompressible. Thus in the high shear rolling it is believed the distance apart of the particles have been altered by distortional shear. These characteristics of surface layer impart a high degree of smoothness to the outer layer by virtue of a stretching action. Densification of the surface layers is a anisotropic and sintering is believed to proceed from the center layers outwards to the surface which is the last to sinter. This stretching of the surface layer with an anisotropic densification of the surface layer is believed to be the critical feature which causes the unique surface morphology of the sintered substrate produced by the process of the present invention. As will be seen from FIG. 10 which is a scanning electron photograph of a green substrate from Mill No. 2 which has been burnt out to remove the binder and has changed from green to white and in which there is no evidence of surface morphological change the crustal growth from the unique surface layer of the ceramic substrate of the present invention occurs during sintering of the substrate.

We claim:

1. An unglazed high density high shear alumina ceramic substrate, said substrate being formed from a visco elastic mass and subjected to high shear rolling, having an average bulk density of at least about 90% of the theoretical density of crystalline alumina and a surface layer of randomly oriented close packed alumina crystals of tabular hexagonal prismatic form providing said surface layer with a density substantailly that of the crystalline alumina forming said surface layer, substantially zero porosity and a surface smoothness of less than 8 microinches.

2. A substrate as claimed in claim 1 having an average bulk density of at least 3.93.

3. A substrate as claimed in claim 1 having an average bulk density of at least 3.96.

4. A susbtrate as claimed in claim 1 having a surface smoothness of less than 5 microinches.

References Cited

UNITED STATES PATENTS

| | | | |
|---|---|---|---|
| 2,947,056 | 8/1960 | Csordas et al. | 106—39 R |
| 3,311,482 | 3/1967 | Klingler et al. | 106—65 |
| 3,516,840 | 6/1970 | Gitzen et al. | 106—65 |
| 2,551,005 | 5/1951 | Johnson | 264—316 |
| 2,999,275 | 9/1961 | Blume | 264—Dig. 58 |
| 3,007,222 | 11/1961 | Ragan | 264—60 |
| 3,097,929 | 7/1963 | Ragan | 264—60 |
| 3,110,675 | 11/1963 | Brailowsky | 264—Dig. 58 |
| 3,074,143 | 1/1963 | Smith | 65—59 |
| 3,428,374 | 2/1969 | Orkin et al. | 106—65 |

OTHER REFERENCES

Kinbery, W. D., Ceramic Fabrication Process, New York, 1958, pp. 151–152 and 163.

L. DEWAYNE RUTLEDGE, Primary Examiner

W. SATTERFIELD, Assistant Examiner

U.S. Cl. X.R.

106—39 R; 264—61; 29—581